US012645012B2

(12) United States Patent
Zhang et al.

(10) Patent No.: US 12,645,012 B2
(45) Date of Patent: Jun. 2, 2026

(54) METHOD OF PRODUCING AN OPTICAL MATERIAL AND OPTICAL MATERIAL

(71) Applicant: Essilor International, Charenton-le-pont (FR)

(72) Inventors: Jianwei Zhang, Shanghai (CN); Laurent Chippaux, Bangkok (TH)

(73) Assignee: Essilor International, Charenton-le-pont (FR)

( * ) Notice: Subject to any disclaimer, the term of this patent is extended or adjusted under 35 U.S.C. 154(b) by 108 days.

(21) Appl. No.: 18/288,298

(22) PCT Filed: Apr. 29, 2022

(86) PCT No.: PCT/EP2022/061601
§ 371 (c)(1),
(2) Date: Oct. 25, 2023

(87) PCT Pub. No.: WO2022/229448
PCT Pub. Date: Nov. 3, 2022

(65) Prior Publication Data
US 2024/0201420 A1 Jun. 20, 2024

(30) Foreign Application Priority Data

Apr. 29, 2021 (EP) ..................................... 21305553

(51) Int. Cl.
*G02B 1/04* (2006.01)
*C08F 20/00* (2006.01)
*G02C 7/02* (2006.01)
(52) U.S. Cl.
CPC .............. *G02B 1/041* (2013.01); *C08F 20/00* (2013.01); *G02C 7/02* (2013.01)

(58) Field of Classification Search
CPC .................................. G02B 1/041; G02C 7/02
See application file for complete search history.

(56) References Cited

U.S. PATENT DOCUMENTS

| | | | |
|---|---|---|---|
| 2003/0166808 A1* | 9/2003 | Okazaki .................. | C08F 20/36 526/273 |
| 2017/0015805 A1* | 1/2017 | Kryger ..................... | C08K 5/19 |

(Continued)

FOREIGN PATENT DOCUMENTS

| | | |
|---|---|---|
| EP | 1361246 | 2/2009 |
| JP | H0999441 | 4/1997 |

OTHER PUBLICATIONS

International Search Report and Written Opinion issued in corresponding PCT Application No. PCT/EP2022/061601, mailed Oct. 10, 2022.

*Primary Examiner* — Yung-Sheng M Tsui
(74) *Attorney, Agent, or Firm* — Norton Rose Fulbright US LLP

(57) ABSTRACT

A method of producing an optical material, wherein a polymerizable composition intended to polymerize to form the optical material comprises: a) monomeric compounds adapted to polymerize, b) at least one catalyst for initiating the polymerization of said monomeric compounds, and c) from more than 1,500 ppm to 3,000 ppm of a release agent, as compared to the total weight of the polymerizable composition, and wherein said polymerizable composition is polymerized under a polymerization cycle including a plurality of steps, the global duration of the polymerization cycle being of less than 19 hours.

11 Claims, 1 Drawing Sheet

(56)                    References Cited

U.S. PATENT DOCUMENTS

Figure 1:
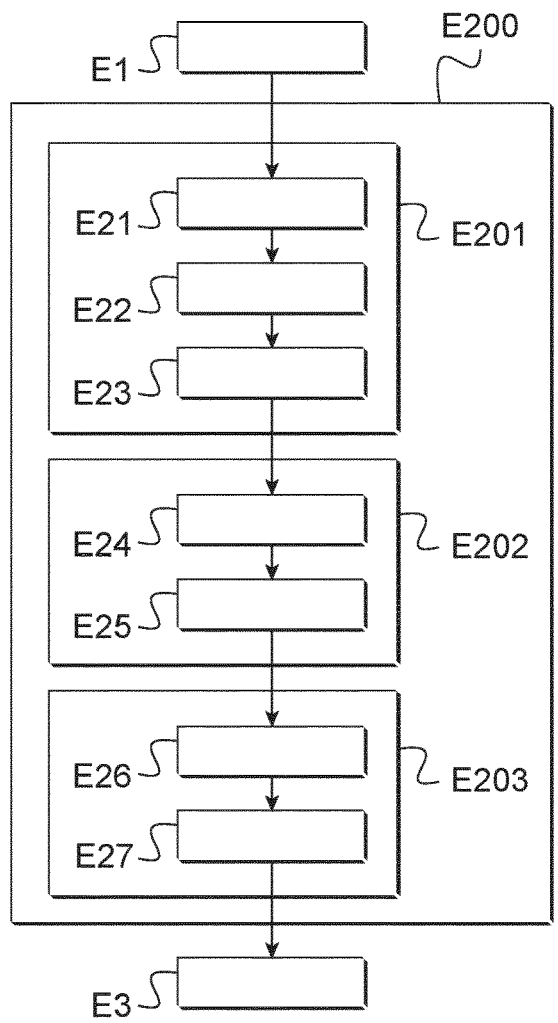

| | | | |
|---|---|---|---|
| 2017/0355106 A1* | 12/2017 | Okazaki .................. | C07F 9/091 |
| 2019/0263846 A1 | 8/2019 | Hong et al. | |
| 2020/0010665 A1* | 1/2020 | Oiki .................. | C08G 18/7642 |
| 2023/0147118 A1* | 5/2023 | Havens ............. | C08G 18/7642 |
| | | | 528/58 |
| 2023/0365737 A1* | 11/2023 | Hanawa ............. | C08G 18/3876 |

* cited by examiner

METHOD OF PRODUCING AN OPTICAL MATERIAL AND OPTICAL MATERIAL

CROSS-REFERENCE TO RELATED APPLICATIONS

This application is a national phase application under 35 U.S.C. § 371 of International Application No. PCT/EP2022/061601 filed 29 Apr. 2022, which claims priority to European Patent Application No. 21305553.6 filed 29 Apr. 2021. The entire contents of each of the above-referenced disclosures is specifically incorporated by reference herein without disclaimer.

TECHNICAL FIELD OF THE INVENTION

The invention relates to a method of producing an optical material and to the optical material obtained thereof.

BACKGROUND INFORMATION AND PRIOR ART

It is known a method of producing an optical material wherein a polymerizable composition that includes a mix of monomers and a catalyst is polymerized under a polymerization cycle wherein the polymerization is induced (or initiated) by an increase in temperature.

After the polymerization is achieved, the optical material is demolded and used for different optical applications. Notably, the optical material can be used as an ophthalmic lens.

However, the known method needs to be improved, notably for shortening the global duration of the polymerization cycle and for easing the demolding of the optical material, without impairing the mechanical and optical properties of the optical material.

SUMMARY OF THE INVENTION

Therefore, one object of the invention is to provide a new method of producing an optical material wherein the global duration of the polymerization cycle is shorten and wherein the optical material is easily demolded without impairing the quality (mechanical and optical properties) of said optical material.

The above object is achieved according to the invention by providing a method of producing an optical material according to claim 1.

In the rest of the description, the unit "ppm" should be understood as "parties per million" and is a weight fraction. In practice, 1 ppm is equal to 1 milligram per kilogram. Such unit is commonly used in the field.

The method of the invention comprises a combination of a short polymerization cycle (less than 19 hours in global) and a new polymerizable composition that includes a release agent in adequate proportions.

More precisely, the introduction of more than 1,500 ppm of release agent in the polymerizable composition eases the further demolding of the optical material together with allowing a shorter duration of the polymerization cycle. The proportion of release agent is however kept under 3,000 ppm, in order not to alter the quality of the final optical material, notably in terms of mechanical and optical properties.

The global duration of the polymerization cycle of the method according to the invention is brought under 19 hours (that is to say shorter than 19 hours), which is economically beneficial but does not impair the mechanical and optical properties of the final optical material. Such shortening of the polymerization cycle is not impairing the quality of the polymerization because the polymerizable composition is modified appropriately according to the invention, so that the final polymerized composition exhibits a satisfying level of reticulation.

Other non-limiting and advantageous features of the method according to the invention, taken individually or in any technically possible combination, are given in claims 2 to 11.

The invention also relates to an optical material obtained by the method of the invention, wherein the optical material exhibits a refraction index of 1.56.

Such optical material is advantageously an ophthalmic lens.

DETAILED DESCRIPTION OF EXAMPLE(S)

The following description with reference to the accompanying drawings will make it clear what the invention consists of and how it can be achieved. The invention is not limited to the embodiment illustrated in the drawings. Accordingly, it should be understood that where features mentioned in the claims are followed by reference signs, such signs are included solely for the purpose of enhancing the intelligibility of the claims and are in no way limiting on the scope of the claims.

Figure 2:
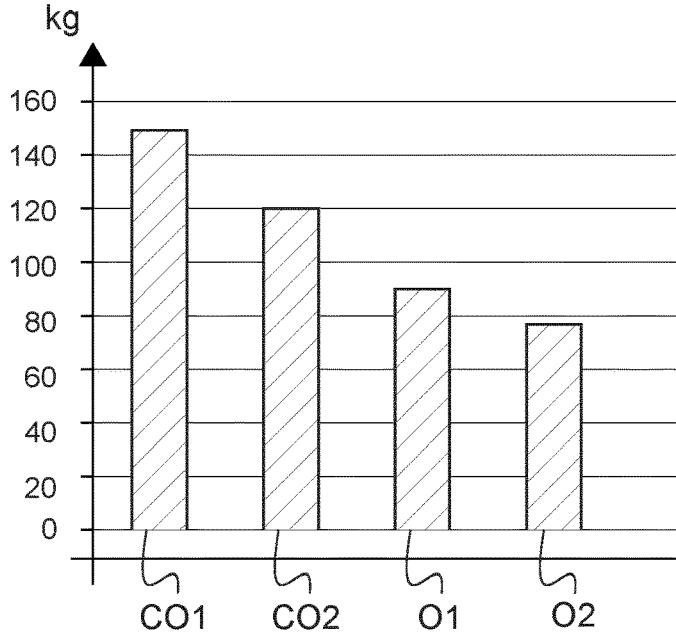

In the accompanying drawings:

FIG. 1 is a flow chart synthetizing the main steps of the method of the invention, and FIG. 2 is a graph showing the maximal dis-assembly force (in kg-equivalent) necessary to demold two optical materials O1 and O2 obtained according to the method of the invention, and two comparative optical materials CO1 and CO2.

In the following description, a range "from x to y" includes the limits x and y, unless it is specified "more than x", in which case x is excluded from the range, and/or "less than y" in which case y is excluded from the range.

On FIG. 1 is shown a flow chart of the main steps of a method according to the invention, for producing an optical material from a polymerizable composition intended to polymerize. The polymerization of the polymerizable composition forms a polymerized composition, also called "optical material".

To get polymerized, the polymerizable composition is subjected to a polymerization cycle wherein the polymerization is induced (or initiated) by an increase in temperature. The polymerization cycle includes a plurality of steps and has a global duration that is the cumulative duration of each step of said cycle.

The expression "polymerization cycle" is commonly used in the field to designate the numerous steps to which is subjected the polymerizable composition in order to achieve its polymerization, therefore leading to the optical material. Such expression should not be understood as a "cycle" comprising successive steps that would repeat cyclically over time.

The method of the invention comprises precise settings of various parameters, notably the choice of the components comprised within the polymerizable composition, and their proportions, as well as the parameters of the steps of the polymerization cycle, such as the duration of the step, the temperatures reached during the polymerization cycle and/or or the speed of temperature changes of each step.

The method of the invention allows a faster production of the optical material, which is economically beneficial, while guaranteeing an easier demolding of the polymerized composition, without impairing the mechanical and optical properties of the optical material thereof obtained, as compared to a similar optical material produced from a known method.

In other words, the method of the invention provides a shorter polymerization cycle together with a new formulation of the polymerizable composition in order to guarantee an adequate level of reticulation of the optical material (that is similar to the level of reticulation of an optical material obtained from a known method) and an easy dis-assembly of the polymerized composition from the mold in which it is polymerized.

The method of the invention results from a compromise between the shortening of the global duration of the polymerization cycle and the ease of demolding of the polymerized composition, without impairing the final quality of the optical material.

More precisely, the polymerizable composition used in the method of the invention comprises:
  a) monomeric compounds (also called monomers) adapted to polymerize,
  b) at least one catalyst for initiating the polymerization of said monomeric compounds, and
  c) from more than 1,500 ppm to 3,000 ppm of a release agent, as compared to the total weight of the polymerizable composition.

According to the embodiment shown on FIG. 1, the method of the invention includes a step of forming the polymerizable composition (block E1). Such formation is for instance achieved by mixing the components in appropriate proportions.

In an alternative embodiment, the polymerizable composition may be formed prior to the implementation of the method of the invention, as long as said composition is still adapted to polymerize, but not polymerized yet when the polymerization cycle starts.

The monomeric compounds of the composition here include acrylic monomeric compounds adapted to polymerize to form an acrylic substrate and/or allylic monomeric compounds adapted to polymerize to form an allylic substrate.

Such monomeric compounds are particularly well suited to form a final optical material that is a transparent ophthalmic lens.

For instance, the monomeric compounds could be a mix of a 1.56 acrylic resin liquid raw material, such as KOC 55, sold by KOC Solution, and a diethylene glycol bis(allyl carbonate), such as CR39®, sold by PPG Industries.

The monomeric compounds represent 90 wt % (or 900,000 ppm) or more, preferably 95 wt % (or 950,000 ppm) or more, even more preferably around 96 wt % (or 960,000 ppm) of the total weight of the polymerizable composition.

The release agent included in the polymerizable composition is for instance a polyoxyethylene alkyl ether phosphate. Whatever its nature, the release agent included in the composition eases the demolding of the final polymerized composition. However, the more release agent is added to the composition, the more the quality of the final optical material risks to be altered, notably mechanically. Therefore, there is an optimum to find in the proportion of release agent to be comprised within the composition.

According to the invention, the release agent represents from more than 1,500 ppm to 3,000 ppm as compared to the total weight of the polymerizable composition.

Preferably, the polymerizable composition comprises from 1,600 ppm to 2,100 ppm of release agent, or even more preferably from 1,900 ppm to 2,100 ppm of release agent, as compared to the total weight of the polymerizable composition. This range of release agent is perfectly adapted for the duration of the polymerization cycle. Specifically, this range of release agent is chosen to avoid technical damages in a releasing step after the polymerization cycle. Then, the optical material obtained according to the method of the current disclosure has very good optical properties. For instance, the polymerizable composition comprises: 1,600; 1,700; 1,800; 1,900; 1,950; 2,000; 2,050 or 2,100 ppm of release agent.

The catalyst is a compound that helps starting the polymerization, and that eases the polymerization as it ensures a certain level of polymerization of the monomers. In practice, there could be one or more catalysts included in the polymerizable composition. The at least one catalyst for initiating the polymerization is for instance chosen from the following list: a peroxicarbonate, a peroxodicarbonate, a peroxyester or a perketal. Of course, the polymerizable composition may comprise a mix of the above cited components as catalysts. Preferably, said at least one catalyst for initiating the polymerization is a diisopropyl peroxydicarbonate.

Surprisingly, the global duration of the polymerization cycle is adjusted in relation with the optimal proportions of release agent as well as catalyst comprised in the composition: the less release agent and the less catalyst, the longer the polymerization cycle. Such adjustment must in addition result in an ease of the demolding of the polymerized composition and a satisfactory final optical material, notably in terms of mechanical and optical properties.

According to an advantageous embodiment of the invention, the polymerizable composition comprises from 20,000 ppm to 35,000 ppm of the at least one catalyst as compared to the total weight of the polymerizable composition. Such a range of catalyst improves the polymerization step. The method according to the current disclosure is thus less time consuming while it provides an optical component having good optical and mechanical properties. The method according to the current disclosure is very effective. Preferably, the polymerizable composition comprises from 30,000 ppm to 32,000 ppm of said at least one catalyst for initiating the polymerization, as compared to the total weight of the polymerizable composition. The method according to current disclosure is even more improved in these proportions of catalyst. For instance, the polymerizable composition comprises 20,000; 21,000; 22,000; 23,000; 24,000; 25,000; 26,000; 27,000; 28,000; 29,000; 30,100; 30,200; 30,300; 30,400; 30,500; 30,600; 30,700; 30,800; 30,900; 31,000; 31,100; 31,200; 31,300; 31,400; 31,500; 31,600; 31,700; 31,800; 31,900; 32,000; 33,000; 34,000; 35,000 ppm of catalyst as compared to the total weight of the polymerizable composition.

In certain embodiments, the polymerizable composition may comprise additives, such as a bluing agent and/or a UV absorber. Such additives are particularly useful if the final optical material is to be used as an ophthalmic lens, in order to protect the corresponding eye of the wearer.

The polymerizable composition comprises from 5,000 ppm to 7,000 ppm of said additives as compared to the total weight of the polymerizable composition. For instance, the polymerizable composition comprises from 4,000 ppm to 5,000 ppm of a bluing agent, and from 1,000 ppm to 2,000 ppm of a UV absorber.

Once the polymerizable composition is formed (block E1 in FIG. 1), it is preferably injected into a mold with known technics.

The mold delineates a piece of housing where the polymerizable composition lies while it is subjected to the polymerization cycle. The contours of the housing delineated by the mold will give its final shape to the optical material, after the polymerizable composition is polymerized and demolded.

Once the polymerizable composition lies within a mold, it is polymerized under the polymerization cycle of the invention (block E200) that includes said plurality of steps (blocks E201, E202 and E203).

The steps of the polymerization cycle are described in terms of relative temperature and/or speed of temperature change, as well as duration. In the rest of the description, the temperature designates the temperature of the atmosphere surrounding the polymerizable composition lying in its mold.

It is essential that the global duration of the polymerization cycle, that is to say the cumulative duration of each step included in the cycle, is of less than 19 hours. More preferably, the global duration of the polymerization cycle is even of 17 hours or less.

However, advantageously, the global duration of the polymerization cycle is of at least 15 hours.

The duration is therefore comprised between 15 hours and less than 19 hours, preferably comprised between 15 hours and 17 hours. Such range of duration both guarantees that the polymerizable composition is fully polymerized and that the polymerization cycle is not too long in order to be economically advantageous.

Specifically, when the global duration of the polymerization cycle is of 17 hours or less or of 15 hours or less, the method according to the current disclosure consumes less energy. The method according to the current disclosure is thus more ecological while disassembly of the optical component after the polymerization cycle is easier to perform. The present method allows therefore to provide an optical component, which has effective optical and mechanical properties.

The range of duration was ingeniously optimized in the present invention, together with the proportion of release agent comprised within the polymerizable composition. Surprisingly, the more release agent, the shorter the polymerization cycle, the global duration of the polymerization cycle having to be shorter than 19 hours, but the more release agent, the more risky it is to impair the mechanical and/or optical properties of the optical material.

The polymerization cycle according to the invention includes the following steps:

heating for a duration of 5.25 hours from about 25° C. to about 40° C. (blocks E201), increasing the temperature from 40° C. to about 85° C. during 7 to 10 hours at a speed ranging from about 5° C./hour to 9° C./hour (block E202), and cooling for 3 hours from 85° C. to about 75° C. (blocks E203).

Preferably, as shown on FIG. 1, the polymerization cycle includes the following steps:

heating for a duration of 5.25 hours from about 25° C. to about 40° C. (blocks E201), increasing the temperature from 40° C. to about 85° C. during 7 hours at a speed ranging from about 5° C./hour to 9° C./hour (block E202), and cooling for 3 hours from 85° C. to about 75° C. (blocks E203).

More precisely, the step of heating (block E201) during 5.25 hours corresponds to a step of initialization of the polymerization.

Such step of heating (block E201) from about 25° C. to 40° C. includes at least:

a first sub-step of heating at a speed faster than 50° C./hour for a duration shorter than an hour (block E21), a second sub-step of maintaining a constant temperature at which is initiated the polymerization (block E22), for a duration longer than the duration of the first sub-step, said constant temperature being higher than or equal to 35° C. and strictly lower than 40° C., and a third sub-step of heating (block E23) at a speed slower than 1° C./hour for a duration longer than the duration of the second sub-step.

In practice, the first sub-step of heating (block E21) is a step wherein the temperature changes from ambient temperature, that is to say approximately 25° C., to the temperature at which the polymerization is initiated, for instance at 35° C., 35.5° C., 36° C., 36.5° C., 37° C., 37.5° C., 38° C., 38.5° C., 39° C. or 39.5° C. The higher the temperature at which is initiated the polymerization, the faster (and therefore shorter) is the second sub-step of maintaining the temperature constant. However, such temperature at which is initiated the polymerization cannot be too high to ensure a high level of reticulation in the final polymerized composition.

The second sub-step (block E22) comprised within the heating step (block E201) is for instance 3, 4, 5, or 6 times longer than the first sub-step (block E21) of said heating step (E201).

The third sub-step (block E23) of the heating step (block E201) aims at increasing the temperature to a temperature at which the composition starts to form a gel. The third sub-step (block E23) is a sensitive step for the monomers of the polymerizable composition. The speed of the temperature change of the third sub-step (block E23) should be a lot smaller than the speed of the temperature change of the first sub-step (block E21).

The step of increasing of the temperature from 40° C. to 85° C. (block E202) comprises at least a first sub-step of heating (block E24) at a speed of at least 5° C./hour followed by a second sub-step of heating (block E25) at a speed faster than the speed of the first sub-step, for a duration shorter than the duration of the first sub-step.

The greater the speed of temperature change of the first sub-step (block E24) of the step of increasing the temperature (block E202), the shorter is such step (block E24), and the faster the gel is generated. However, the speed of temperature change should be controlled to allow the appropriate level of reticulation to get reached.

The cooling step (block E203) of the polymerization cycle (block E200) comprises at least a first sub-step (block E26) of maintaining the temperature at 85° C. for a given duration followed by a second sub-step (block E27) of cooling the temperature at a speed of at least −10° C./hour for a duration shorter than that of the first sub-step (block E26).

Once the step of increasing the temperature (E202) and the first sub-step (block E26) of the cooling step (block E203) are over, the composition is considered to be polymerized.

After the end of the second sub-step (block E27) of the cooling step (block E203) of the polymerization cycle (E200), the polymerized composition clots and is easier to manipulate.

Once the polymerization cycle is over, that is to say after the second sub-step (block E27) of the cooling step (block E203) of the polymerization cycle (block E200), the polymerized composition is obtained and demolded.

According to the embodiment shown on FIG. 1, such step of demolding is included within the method of the invention (block E3).

According to an alternative embodiment (not shown), the step of demolding could be implemented after the method of the invention is achieved.

To be demolded, the polymerized composition is pushed (or pulled) outside of the mold, and the optical material is therefore obtained. In practice, the optical material and the polymerized composition designate the same object, apart that the optical material designates the object outside of the mold, while the polymerized composition designates the object inside the mold. In other word, once the polymerized composition is demolded, it forms the final optical material.

Thanks to the method of the invention the demolding of the optical material is eased, that is to say that the mean force necessary to separate the optical material from its mold is lower than the mean force necessary to separate a similar optical material obtained from a known method (or another method than that of the invention) from its mold.

In the present case, said mean force necessary to separate from its mold the optical material obtained from the method of the invention is lower than or equal to 1,600 Newton. Preferably, said mean force is lower than 1,500 Newton, even more preferably lower than 1,400 Newton. Notably, said mean force is lower than or equal to 1,400; 1,300; 1,200; 1,100; 1,000; 950; 900; 850; 800; 750; 700; 650; 600; 550; 500 and 450 Newton.

The method of the invention is particularly useful to obtain an optical material that exhibits a refraction index of 1.56.

The method of the invention is particularly useful to obtain an optical material that is an ophthalmic lens, more preferably a transparent ophthalmic lens.

EXAMPLE

On FIG. 2 is given the maximal force (given in kilograms equivalent, kg, that is to say the force in Newton divided by the g-constant, which is the gravitational acceleration on Earth of about 9.8 $m \cdot s^{-2}$) necessary to demold 4 different polymerized compositions from their respective mold: 2 of said demolded polymerized compositions form optical materials O1 and O2 obtained from the claimed method, and two other demolded polymerized compositions form comparative optical materials, CO1 obtained from a known method of the past and CO2 obtained according to a non-satisfactory comparative method.

More precisely, optical materials O1 and O2 are both obtained from the claimed method as described on FIG. 1, wherein the main parameters of said method are summarized in table 1 hereunder. Notably, both optical materials O1 and O2 are obtained from a polymerizable composition comprising: from 70 to 90 wt % of KOC55 and from 5 to 20 wt % of CR39®, from 4,300 to 4,500 ppm of bluing agent, from 1,600 to 1,800 ppm of UV absorber and the quantity of catalyst and release agent given in table 1.

TABLE 1

| Example | Composition | | Polymerization cycle | |
| | Catalyst (ppm)t | Release Agent (ppm) | Temperature at which the polymerization is initiated | Duration (hours) |
| --- | --- | --- | --- | --- |
| 01 | 30,100 | 1,800 | 38° C. | 15.25 |
| 02 | 30,100 | 2,000 | 38° C. | 15.25 |

The comparative optical material CO1 and CO2 are obtained according to the known method detailed hereafter and according to a non-satisfactory method, respectively.

The comparative optical material CO1 is obtained from a polymerizable composition comprising: from 70 to 90 wt % of KOC55 and from 5 to 20 wt % of CR39®, from 4,500 to 4,700 ppm of bluing agent, from 1,600 to 1,800 ppm of UV absorber, from 28,000 to 30,000 ppm of catalyst and 0 ppm of release agent.

The comparative optical material CO2 is obtained from a polymerizable composition comprising: from 70 to 90 wt % of KOC55 and from 5 to 20 wt % of CR39®, from 4,300 to 4,500 ppm of bluing agent, from 1,600 to 1,800 ppm of UV absorber, from 28,000 to 30,000 ppm of catalyst and 1,500 ppm of release agent.

The polymerization cycle of the known method and of the non-satisfactory method includes the following steps:

heating for a duration of 5.25 hours from about 25° C. to about 40° C., increasing the temperature from 40° C. to about 85° C. during 11 hours at two different speeds: a first speed lower than 5° C./hour and a second speed higher than 8° C./hour, and cooling for 3 hours from 85° C. to about 75° C.

In the polymerization cycle of the known method and of the non-satisfactory method, the temperature at which is initiated the polymerization is 35° C., and the cycle lasts for more than 19 hours.

As it can be seen from FIG. 2, the force (also called dis-assembly force) necessary to demold the polymerized compositions forming the optical materials O1 and O2 obtained according to the method of the invention is lower than 100 kg (or 1,000 Newton). On the contrary, the dis-assembly force necessary to demold the polymerized composition forming the first comparative optical material (CO1) obtained from the known method is of approximately 150 kg (or 1,500 Newtons) and definitely greater than 140 kg (or 1,400 Newton).

The dis-assembly force necessary to demold the polymerized composition forming the second comparative optical material (CO2) obtained from the non-satisfactory method is lowered as compared to force necessary to demold the polymerized composition forming the first comparative optical material (CO2). However, the duration of the polymerization cycle through which is obtained the second comparative optical material CO2 is too long. Therefore, the second comparative example CO2 does not form a satisfactory compromise between the quantity of release agent comprised in the polymerizable composition and the duration of the polymerization cycle.

As shown on FIG. 2, the more release agent comprised within the polymerizable composition of the invention, the lower the dis-assembly force.

The invention claimed is:

1. A method of producing an optical material, wherein a polymerizable composition intended to polymerize to form the optical material comprises:

a) monomeric compounds adapted to polymerize, said monomeric compounds include acrylic monomeric compounds adapted to polymerize to form an acrylic substrate or allylic monomeric compounds adapted to polymerize to form an allylic substrate;

b) from 20,000 ppm to 35,000 ppm of at least one catalyst for initiating the polymerization of said monomeric compounds as compared to the total weight of the polymerizable composition; and c) from more than 1,500 ppm to 3,000 ppm of a release agent, as compared to the total weight of the polymerizable composition;

wherein said polymerizable composition is polymerized under a polymerization cycle including a plurality of steps, the global duration of the polymerization cycle being of less than 17 hours and of at least 15 hours; and wherein the polymerization cycle includes the following steps:

heating for a duration of less than 7 hours from about 25°° C. to about 40° C., increasing the temperature from 40° C. to about 85° C. during 7 to 10 hours at a speed ranging from about 5°° C./hour to 9° C./hour, and cooling for 3 hours from 85° C. to about 75° C.

2. The method of claim 1, wherein the polymerizable composition comprises from 1,900 ppm to 2,100 ppm of release agent as compared to the total weight of the polymerizable composition.

3. The method of claim 1, wherein the step of heating from about 25° C. to 40° C. includes at least:

a first sub-step of heating at a speed faster than 50° C./hour for a duration shorter than an hour;

a second sub-step of maintaining a constant temperature at which is initiated the polymerization, for a duration longer than the duration of the first sub-step, said constant temperature being higher than or equal to 35° C. and strictly lower than 40° C.; and a third sub-step of heating at a speed slower than 1° C./hour for a duration longer than the duration of the second sub-step.

4. The method of claim 1, wherein the step of increasing of the temperature from 40° C. to 85° C. comprises at least a first sub-step of heating at a speed of at least 5° C./hour followed by a second sub-step of heating at a speed faster than the speed of the first sub-step, for a duration shorter than the duration of the first sub-step.

5. The method of claim 1, wherein said polymerizable composition comprises from 30,000 ppm to 32,000 ppm of said at least one catalyst for initiating the polymerization, as compared to the total weight of the polymerizable composition.

6. The method of claim 1, wherein said at least one catalyst for initiating the polymerization is a peroxicarbonate, a peroxodicarbonate, a peroxyester or a perketal.

7. The method of claim 1, wherein said release agent is a polyoxyethylene alkyl ether phosphate.

8. The method of claim 1, wherein the optical material is obtained by demolding the polymerized composition with a mean force lower than or equal to 1,400 Newton.

9. An optical material obtained by the method of claim 1, wherein the optical material exhibits a refraction index of 1.56.

10. The optical material of claim 9, wherein said optical material is an ophthalmic lens.

11. The method claim 6, wherein said at least one catalyst for initiating the polymerization is a diisopropyl peroxydicarbonate.

* * * * *